(No Model.)

P. W. SWAN.
AUTOMATIC SPRINKLER.

No. 488,257. Patented Dec. 20, 1892.

Witnesses
L. W. Howes
James D. Thomson

Inventor
Phineas W. Swan
per T. W. Porter Atty

UNITED STATES PATENT OFFICE.

PHINEAS W. SWAN, OF WINCHESTER, MASSACHUSETTS.

AUTOMATIC SPRINKLER.

SPECIFICATION forming part of Letters Patent No. 488,257, dated December 20, 1892.

Application filed August 29, 1892. Serial No. 444,348. (No model.)

*To all whom it may concern:*

Be it known that I, PHINEAS W. SWAN, of Winchester, in the county of Middlesex and State of Massachusetts, have invented a new and useful Improvement in Automatic Sprinklers, which will, in connection with the accompanying drawings, be hereinafter fully described, and specifically defined in the appended claims.

Figure 1:
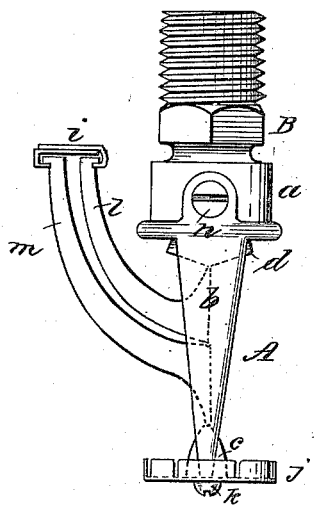
Figure 2:
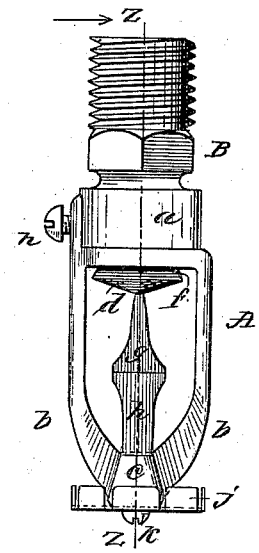
Figure 3:
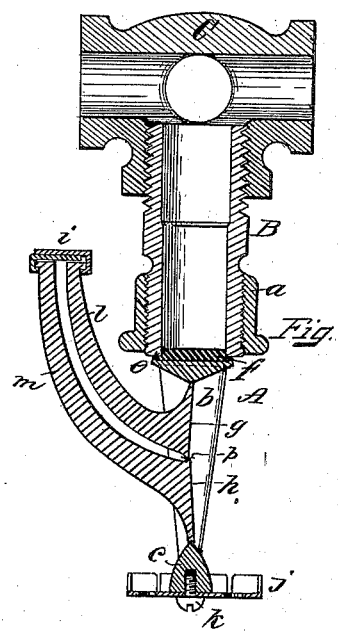
Figure 4:
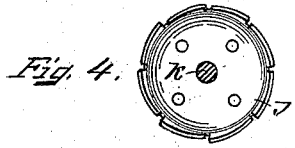

In said drawings, Figure 1 is a side elevation of my extinguisher. Fig. 2 is a front elevation of the same. Fig. 3 is a central vertical section taken on line Z, Fig. 2; and Fig. 4 is a top plan view of the rotary distributer, with its holding screw shown in section.

The object of my invention is to provide a sprinkler that shall have great power to resist pressure of water or air; that shall be sensitive in case it is acted upon by heat; that when its fusible holder is liberated by heat, is sure to become operative, and will never resolder after it is once liberated; that is light yet strong; and in which the strain is almost direct so that it may with extreme lightness still resist great pressure. And it will be next herein described and then specified in the claims.

The frame is shown at A, and consists of the internally threaded ring $a$, the arms $b$ that extend from $a$, and the connecting portion $c$, at the end of arms $b$. A sleeve B is threaded to fit in ring A, and to be inserted in coupling C, of the overhead water pipe system. Said arms are largest and strongest at ring $a$, and they steadily diminish from $a$ to $c$, and as they approach the latter, they are widened in a radial direction and are brought to a sharp edge on the inside, in order that they may interfere as little as possible with the movement of the escaping water.

The valve is shown at $d$, as resting against its seat $e$, and as provided with packing $f$. The valve is held to its seat by the struts $g, h$, which are of such length that when the valve is firmly seated the struts are yet slightly deflected to one side in order that when the struts are liberated the pressure upon the valve $d$ shall instantly throw them out of place, and thus liberate the valve. Said strut $g$ has a curved arm $l$ extending outward and upward, and strut $h$ has a similar arm $m$, and to secure them together and in place a clutch $i$ formed of two thin pieces of metal are soldered together, and the down-turned ends thereof engage the ends of said arms $l, m$, as shown. Strut $g$ is formed at its respective ends with broadened indentations, the lower end resting upon the corresponding knife-like edge of part $c$, while its upper end receives the corresponding edge of strut $h$, while the top end of this latter strut is formed round to rest in the depression in the lower face of valve $d$.

In order to place my sprinkler in position for use, the thimble B is inserted firmly in place in coupling C; then the frame A is, by its ring $a$, arranged on B; then valve $d$ is placed in position, the struts are then arranged in place and clutch $i$ is placed on arms $l, m$, when by rotating the frame on thimble B, the valve will, by the struts $g, h$, be forced solidly against the lower face of thimble B, which is the valve seat. When the parts are thus arranged the screw $n$, threaded in ring $a$, is turned in against thimble B, to lock the parts in place.

To distribute the water after it leaves thimble B, I arrange the distributer $j$ at the bottom of frame A, where it is secured in place by screw $k$, as shown. Said distributer is formed with a turned up serrated edge, the teeth of which are arranged oblique to a tangential line so that the escaping water, as it impinges against said teeth, shall cause the distributer to rotate on screw $k$ with great rapidity, thereby hurling the water to a greater breadth and with an entire uniformity over the surface thus being sprinkled. I puncture several holes in the bottom of each distributer as shown in order that the surface immediately beneath it may be uniformly wet with all of the surrounding surface.

My sprinkler may be used either as a pendent or an upright head.

In order to obviate any possibility of the struts $g, h$, adhering one to the other, I interpose a thin piece of mica in the joint thereof, as shown at $p$.

What I claim as my invention is

1. A sprinkler formed with a frame consisting of ring $a$, arms $b$, and part $c$, a valve seat and valve; the struts $g, h$ constructed and arranged as shown, and having the respective curved arms *l*, *m*, and the soldered clutch *i* arranged thereon; substantially as specified.

2. In a sprinkler formed and provided with a valve seat and valve, and a distributer; the struts *g*, *h*, of a length slightly greater than the distance from the valve to the lower part of the frame and formed with the respective curved arms *l*, *m* and a fusible metal holder to confine said arms in place; substantially as specified.

PHINEAS W. SWAN.

Witnesses:
L. W. HOWES,
T. W. PORTER.